(12) United States Patent
Dottax et al.

(10) Patent No.: US 10,581,589 B2
(45) Date of Patent: Mar. 3, 2020

(54) METHOD FOR THE AUTHENTICATION OF A FIRST ELECTRONIC ENTITY BY A SECOND ELECTRONIC ENTITY, AND ELECTRONIC ENTITY IMPLEMENTING SUCH A METHOD

(71) Applicant: OBERTHUR TECHNOLOGIES, Colombes (FR)

(72) Inventors: Emmanuelle Dottax, Colombes (FR); Florian Galdo, Colombes (FR); Jean-Philippe Vallieres, Colombes (FR)

(73) Assignee: IDEMIA FRANCE, Colombes (FR)

( * ) Notice: Subject to any disclaimer, the term of this patent is extended or adjusted under 35 U.S.C. 154(b) by 306 days.

(21) Appl. No.: 15/316,374

(22) PCT Filed: May 29, 2015

(86) PCT No.: PCT/FR2015/051424
§ 371 (c)(1),
(2) Date: Dec. 5, 2016

(87) PCT Pub. No.: WO2015/185833
PCT Pub. Date: Dec. 10, 2015

(65) Prior Publication Data
US 2019/0020469 A1 Jan. 17, 2019

(30) Foreign Application Priority Data
Jun. 6, 2014 (FR) .................................... 14 55185

(51) Int. Cl.
*H04L 9/06* (2006.01)
*H04L 29/06* (2006.01)
(Continued)

(52) U.S. Cl.
CPC ............ *H04L 9/0618* (2013.01); *G06F 7/588* (2013.01); *G06Q 20/356* (2013.01); *G07F 7/08* (2013.01);
(Continued)

(58) Field of Classification Search
None
See application file for complete search history.

(56) References Cited

U.S. PATENT DOCUMENTS 7,805,611 B1 * 9/2010 Montemayor ........ G06F 21/606
 380/255
9,779,224 B2 * 10/2017 Erlikhman ................ H04L 9/32
(Continued)

OTHER PUBLICATIONS

Chen, Lily; NIST Special Publication 800-108; 2009; Retrieved from the Internet <URL: https://nvlpubs.nist.gov/nistpubs/Legacy/SP/nistspecialpublication800-108.pdf>; pp. 1-21, as printed. (Year: 2009).*

(Continued)

*Primary Examiner* — Saleh Najjar
*Assistant Examiner* — Michael W Chao
(74) *Attorney, Agent, or Firm* — Young & Thompson

(57) ABSTRACT

A method for the authentication of a first electronic entity (C) by a second electronic entity (H), wherein the first electronic entity (C) implements the following steps: reception of a challenge (HCH) from the second electronic entity (H); generation of a number (CCH) according to a current value of a counter (SQC) and a first secret key (K-ENC); generation of a cryptogram (CAC) according to the challenge (HCH) and a second secret key (S-MAC); and transmission of a response including the cryptogram (CAC) to the second electronic entity (H), without transmission of the number (CCH).

15 Claims, 2 Drawing Sheets

(51) Int. Cl.
*H04L 9/00* (2006.01)
*H04L 9/32* (2006.01)
*H04L 9/08* (2006.01)
*G07F 7/08* (2006.01)
*G06Q 20/34* (2012.01)
*H04W 12/06* (2009.01)
*G06F 7/58* (2006.01)

(52) U.S. Cl.
CPC .............. *H04L 9/00* (2013.01); *H04L 9/0838* (2013.01); *H04L 9/0861* (2013.01); *H04L 9/0869* (2013.01); *H04L 9/32* (2013.01); *H04L 9/3271* (2013.01); *H04L 9/3273* (2013.01); *H04L 63/0853* (2013.01); *H04W 12/06* (2013.01)

(56) References Cited

U.S. PATENT DOCUMENTS

| | | | |
|---|---|---|---|
| 10,200,367 B2* | 2/2019 | Chastain | H04W 12/06 |
| 10,223,096 B2* | 3/2019 | Ziat | G06F 8/65 |
| 10,223,743 B2* | 3/2019 | Walker | G06Q 20/3278 |
| 2009/0193264 A1* | 7/2009 | Fedronic | G06F 21/31 |
| | | | 713/184 |
| 2013/0111598 A1* | 5/2013 | Marcovecchio | H04L 67/34 |
| | | | 726/26 |
| 2014/0149746 A1* | 5/2014 | Yau | G06F 21/35 |
| | | | 713/185 |
| 2015/0334095 A1* | 11/2015 | Thibaudeau | H04L 63/061 |
| | | | 713/171 |
| 2016/0344710 A1* | 11/2016 | Khan | H04L 63/061 |
| 2019/0007383 A1* | 1/2019 | Vallieres | H04L 63/0428 |
| 2019/0007388 A1* | 1/2019 | Chastain | G06F 21/31 |

OTHER PUBLICATIONS

Dworkin, Morris; NIST Special Publication 800-38B; 2005; Retrieved from the Internet <URL: https://nvlpubs.nist.gov/nistpubs/specialpublications/nist.sp.800-38b.pdf>; pp. 1-21, as printed. (Year: 2005).*

"Chapter 12: Key Establishment Protocols ED—Menezes A J; Van Oorschot P C; Vanstone S A", Handbook of Applied Cryptography; [CRC Press Series on Discrete Mathematices and Its Applications], CRC Press, Boca Raton, FL, US pp. 489-541 , Oct. 1, 1996 (Oct. 1, 1996), XP001525012, ISBN: 978-0-8493-8523-0, Retrieved from the Internet: URL: http://cacr.math.uwaterloo.ca/hac/ pp. 498-499.

"Chapter 10: Identification and Entity Authentication ED—Menezes A J; Van Oorschot P C; Vanstone S A", Handbook of Applied Cryptography; [CRC Press Series on Discrete Mathematices and Its Application], CRC Press, Boca Raton, FL, US, pp. 385-424, Oct. 1, 1996 (Oct. 1, 1996), XP001525010, ISBN: 978-0-8493-8523-0, Retrieved from the Internet: URL:http://www.cacr.math.uwaterloo.ca/hac/ pp. 399-402.

"Global Platform Card Technology—Secure Channel Protocol 03—Card Specification v 2.2 Amendment D, version 1.0", Internet Citation, Apr. 2009 (Apr. 2009), pp. 1-16, XP009182501, Retrieved from the Internet: URL: http://www.globalplatform.org/specificatationcard.asp [retrieved on Feb. 10, 2015] cited in the application, the whole document.

"Global Platform Card Specification Version 2.2", Mar. 31, 2006 (Mar. 31, 2006), XP055090891, Retrieved from the Internet: URL:http://www.win.tue.nl/pinpasjc/docs/GPCardSpec_v2.2.pdf [retrieved on Nov. 29, 2013], pp. 2, pp. 270, 271.

International Search Report, dated Aug. 21, 2015, from corresponding PCT Application.

Perrig, Adrian, et al. "SPINS: Security protocols for sensor networks." Wireless networks 8.5 (2002): 521-534. XP001131432, ISSN: 1022-0038, DOI: 10.1023/A:1016598314198.

* cited by examiner

METHOD FOR THE AUTHENTICATION OF A FIRST ELECTRONIC ENTITY BY A SECOND ELECTRONIC ENTITY, AND ELECTRONIC ENTITY IMPLEMENTING SUCH A METHOD

TECHNICAL FIELD TO WHICH THE INVENTION PERTAINS

The present invention relates to the establishment of a secure channel between two electronic entities.

It relates more particularly to a method of authentication of a first electronic entity by a second electronic entity, as well as to an electronic entity implementing such a method.

The invention applies particularly advantageously in the case where a cryptographic key used by the first electronic entity to generate a challenge intended for the second electronic entity is also used to generate a session key intended to encipher exchanges of data between the first electronic entity and the second electronic entity.

TECHNOLOGICAL BACKGROUND

When a first electronic entity wishes to authenticate itself with a second electrical entity by proving its knowledge of a secret (in general a cryptographic key) without transmitting this secret, it is possible to undertake an exchange of challenge-response type between the two electronic entities: the second electronic entity dispatches a challenge to the first electronic entity, which, in order to authenticate itself, must send back in return an expected response associated with the challenge, typically the result of a calculation combining the challenge received and the secret.

In order to carry out mutual authentication, the first electronic entity likewise dispatches a challenge to the second electronic entity, which must determine the expected response to this other challenge and send it to the first electronic entity.

The challenges used are in general random numbers generated by the electronic entity that sent the challenge, so as to prevent an ill-intentioned third party from authenticating itself by simple repetition (sometimes dubbed "replay") of a response sent previously by the first electronic entity.

These random values can furthermore be used, in combination with a cryptographic key known only to the two electronic entities, to generate session keys aimed at securing the exchange of data between the two electronic entities. The session keys thus generated are thus different for each session of exchanges between the two electronic entities.

However, the use of random values generated respectively in each of the two electronic entities necessitates the bidirectional exchange of data so as to successfully accomplish the process of mutual authentication and of generating the session keys (since each entity must receive the random value generated by the other entity).

To avoid this and thus allow the implementation of such processes without having to wait for an immediate return from the first electronic entity (called the "slave" hereinafter), provision has been made to use, instead of the random value generated by the first electronic entity, a so-called "pseudo-random" value, based for example on the value of a counter of the first electronic entity.

The second electronic entity (called the "master" or "host" hereinafter), which also knows the value of the counter, can thus prepare in advance the data to be dispatched (typically in the form of commands destined for the slave electronic entity), by enciphering these data by means of the session key obtained as a function in particular of the value of the counter, and transmit them in batches.

This technique is used to personalize secure electronic entities (such as microcircuit cards or secure integrated circuits) but can also be used in other contexts.

Processes such as presented hereinabove are for example described in the technical specification "*GlobalPlatform Card Technology—Secure Channel Protocol* 03—*Card Specification v* 2.2 *Amendment D*", version 1.1, September 2009.

This specification provides in particular that the response of the slave electronic entity to the challenge of the host electronic entity be accompanied by the challenge generated by the slave electronic entity and intended for the host electronic entity, as is usual when mutual authentication is sought.

SUBJECT OF THE INVENTION

In this context, the present invention proposes a method of authentication of a first electronic entity by a second electronic entity, characterized by the following steps implemented by the first electronic entity:

- reception of a (first) challenge originating from the second electronic entity;
- generation of a number (or second challenge, thus dubbed by reference to the aforementioned technical specification) as a function of a current value of a counter and of a first secret key;
- generation of a cryptogram as a function of the (first) challenge and of a second secret key;
- transmission to the second electronic entity of a response including the cryptogram without transmission of said number (second challenge).

The absence of transmission of the number (second challenge) makes it possible to prevent an attacker from being able to attempt to discover the first secret key by observing the values of the number (second challenge) that are transmitted during repeated implementations of the method, as is the case during an attack by cryptoanalysis.

The absence of transmission of the number (second challenge) is however not prejudicial to the continuation of the authentication process since in this instance it is a pseudo-random value, that the second electronic entity can determine on the basis of a datum representative of the current value of the counter.

The second secret key is for example a session key generated in particular on the basis of the (first) challenge. As explained further on, the (first) challenge can be a random value generated by the second electronic entity, in which case the second secret key is different each time.

The response can on the other hand include, for example instead of the second challenge (in accordance with the aforementioned technical specification), a random number generated by the first electronic entity or a predetermined value. Provision may be made moreover for the response to include said current value.

In practice, the random number or the predetermined value can be situated in the response at a location provided for in respect of a card challenge according to the Secure Channel Protocol 03 protocol, the technical specification of which is mentioned hereinabove.

The cryptogram and the number (second challenge) can besides be respectively a card cryptogram and a card challenge in accordance with the Secure Channel Protocol 03 protocol.

The method can furthermore comprise a step of generating a session key as a function of a cryptographic key, of the (first) challenge and of the number (second challenge). According to a possibility of implementation described further on, this cryptographic key is the first secret key.

Provision may be made thereafter for a step of exchanging, between the first electronic entity and the second electronic entity, data enciphered by means of an encipherment algorithm using the session key.

As already indicated, the second secret key can likewise be one of the session keys generated. The cryptogram is then generated on the basis of a different session key for each implementation of the method. An attacker can in this case deduce nothing by observing the successive values of the cryptogram.

In practice, the step of generating the cryptogram can use said number (second challenge).

The authentication method can furthermore comprise the following steps implemented by the second electronic entity:
- determination of a second challenge as a function of a datum representative of the current value of the counter and of the first secret key;
- determination of another cryptogram as a function of the second challenge and of a third secret key (possibly identical to the second secret key);
- transmission of the other cryptogram to the first electronic entity for authentication of the second electronic entity by the first electronic entity.

The first electronic entity is for example a microcircuit card or a secure integrated circuit; the second electronic entity can be a remote server or a telecommunications terminal.

The invention also proposes an electronic entity comprising means for receiving a (first) challenge originating from another electronic entity, means for generating a number (second challenge) as a function of a current value of a counter and of a first secret key, means for generating a cryptogram as a function of the (first) challenge and of a second secret key and means for transmitting to the other electronic entity a response including the cryptogram without transmission of said number (second challenge).

The optional characteristics presented hereinabove in relation to the authentication method can also apply to this electronic entity.

DETAILED DESCRIPTION OF AN EXEMPLARY EMBODIMENT

The description which follows with regard to the appended drawings, given by way of nonlimiting examples, will clearly elucidate the realization of the invention and how it can be embodied.

In the appended drawings:

FIG. 1 represents a process for initiating a secure exchange of data between a first electronic entity and a second electronic entity in accordance with the teachings of the invention.

Each of the first and second electronic entities comprises a communication interface by means of which the electronic entity concerned can send and/or receive data over a communication medium, where the data are represented by signals, for example electrical or optical signals.

The first electronic entity and the second electronic entity can thus exchange data either directly (their respective communication interfaces being connected to one another), or by way of one or more other electronic entities (for example computers), optionally linked together and to the first and second electronic entities by means of a computer network.

Each of the first and second electronic entities is for example an electronic device which comprises, in addition to the communication interface mentioned hereinabove, a processor and at least one memory able to store the data received and manipulated by the electronic entity. This memory also stores computer program instructions which, when they are executed, allow the implementation by the electronic entity of the methods described hereinbelow. As a variant, at least one of the electronic entities could be implemented in the form of an application specific integrated circuit (ASIC).

In the example which follows, the first electronic entity is a microcircuit card C (or ICC for "Integrated Circuit Card") and the second electronic entity is a terminal H. The invention applies, however, to other types of electronic entities.

By way of example, the first electronic entity can be as a variant a secure integrated circuit (or SE for "Secure Element"), an eSE ("embedded secure element") or an eUICC ("embedded Universal Integrated Circuit Card"). A secure element comprises its own processor, different from the processor of the host electronic device in which it is integrated or embedded, and a non-volatile memory for storing computer programs executable by the processor. The secure element is for example in accordance with the ISO/IEC 7816 norms, with the Common Criteria standards and/or with the GlobalPlatform Card Specification v 2.2.1 standard.

The second electronic entity could for its part be a remote server connected to the first electronic entity through a wireless connection, or a server connected directly to the second entity through a wired connection.

Figure 1:
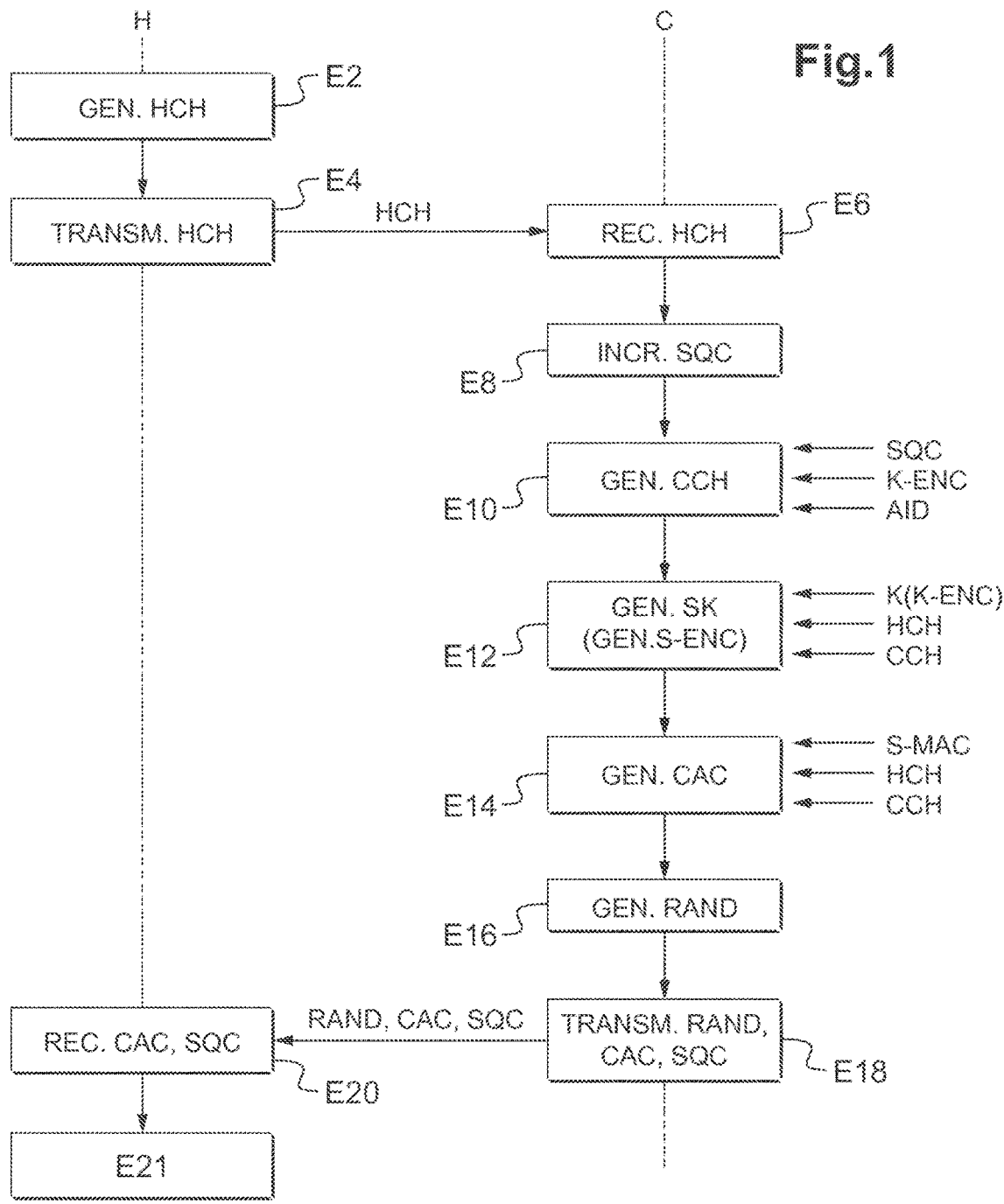
FIG. 1 represents the main steps of a process for initiating a secure exchange of data between a first electronic entity and a second electronic entity in accordance with the teachings of the invention.

The method represented in FIG. 1 allows the launching of a mutual authentication process between the two electronic entities, on the initiative of the terminal H which here plays the role of master or host electronic entity.

During a step E2, the terminal H generates a host challenge HCH by random drawing.

The terminal H then sends (step E4) the microcircuit card C a command for initializing the mutual authentication process, for example a command of the type INITALIZE UPDATE, accompanied by the host challenge HCH.

As already indicated, this command can be transmitted directly from the terminal H to the microcircuit card C (the communication interfaces being for example respectively a card reader fitted to the terminal H and the contacts of the microcircuit card C), or by way of one or more other electronic entities. The microcircuit card C receives the initialization command and the host challenge HCH in step E6.

The microcircuit card C then undertakes the incrementation of a counter SQC in step E8. A new counter value must indeed be used to generate new session keys as explained hereinbelow. Alternatively, the incrementation of the counter is carried out by the microcircuit card C on completion of the reception of the EXTERNAL AUTHENTICATE command described hereinafter.

Step E8 is followed by step E10 in which is generated (for example by means of a key-derivation process) a pseudo-random value (or number) CCH as a function of the current value of the counter SQC (value after incrementation of step E8), of a cryptographic key K-ENC stored in the microcircuit card C and of an identifier AID of the application for which the establishment of the secure channel is performed. The generation of the pseudo-random value CCH is for example carried out in accordance with what is provided for in the paragraph "6.2.2.1 Card Challenge" in the document "*GlobalPlatform Card Technology—Secure Channel Protocol 03—Card Specification v 2.2 Amendment D*" already mentioned.

It is noted that the cryptographic key K-ENC used here for generating the pseudo-random value (or number) CCH is a static key, which therefore has a constant value during successive implementations of the method (with a view, each time, to the establishment of a new session of exchanges between the terminal H and the microcircuit card C).

Moreover, as will be explained hereinbelow, the pseudo-random value (or number) CCH is used as challenge of the microcircuit card C (within the meaning of the SCP03 protocol mentioned above) for authentication of the terminal H with the microcircuit card C.

Step E12 is then undertaken in which the microcircuit card C generates various session keys SK. Each session key SK is for example generated, by means of a key-derivation process, on the basis of a corresponding (so-called static) cryptographic key K stored in the microcircuit card C, of the host challenge HCH (received in step E6) and of the pseudo-random value CCH (generated in step E10). The generation of the session keys SK is for example carried out in accordance with what is provided for in the paragraph "6.2.1 AES Session Keys" in the document "*GlobalPlatform Card Technology—Secure Channel Protocol 03—Card Specification v 2.2 Amendment D*" already mentioned.

Among the session keys SK, an encipherment session key S-ENC in particular is generated on the basis of the cryptographic key K-ENC already mentioned, of the host challenge HCH and of the pseudo-random value CCH.

The microcircuit card C thereafter determines in step E14 the card authentication cryptogram CAC, for example by means of a key-derivation process, on the basis of one of the session keys SK (for example an integrity verification session key S-MAC distinct from the encipherment session key S-ENC), of the host challenge HCH (received in step E6) and of the pseudo-random value CCH (generated in step E10). The determination of the card authentication cryptogram CAC is for example carried out in accordance with what is provided for in the paragraph "6.2.2.2 Card Authentication Cryptogram" in the document "*GlobalPlatform Card Technology—Secure Channel Protocol 03—Card Specification v 2.2 Amendment D*" already mentioned.

The microcircuit card C thereafter generates in step E16 a random number RAND, for example of length (in bytes) equal to that of the pseudo-random value CCH (here 8 bytes).

The microcircuit card C then sends in step E18 its response to the initialization command (see hereinabove steps E4 and E6), which response includes the random number RAND generated in step E16, the cryptogram CAC generated in step E14 and the current value of the counter SQC.

It is noted that, because of the use of a random number RAND of the same length as the pseudo-random value CCH, the response has the length provided for in the document "*GlobalPlatform Card Technology—Secure Channel Protocol 03—Card Specification v 2.2 Amendment D*" already mentioned, i.e. here 32 bytes.

However, because this response does not contain the number (here a pseudo-random value) CCH such as defined as challenge of the card ("card challenge") by the previously mentioned document (but here a random number RAND), it will not be possible for an ill-intentioned third party to attempt to deduce the cryptographic key K-ENC (used for generating the pseudo-random value as indicated hereinabove) by observing the number (pseudo-random value) CCH, typically during successive implementations of a large number of such processes of mutual authentication.

According to a conceivable variant, the microcircuit card C could return a predetermined or deterministic value instead of the random number RAND (in which case step E16 of generating the random number RAND could be omitted).

According to another conceivable variant, the microcircuit card C might not return any datum instead of the random number RAND. The response sent by the microcircuit card C in step E18 could then for example contain only the cryptogram CAC and the counter SQC.

According to another possibility of embodiment, which can be combined with the diverse embodiments which have just been indicated, the counter SQC might not be included in the response sent by the microcircuit card C in step E18.

The terminal H receives the response in step E20 and can thus store, in particular, the card authentication cryptogram CAC included in this response.

Figure 2:
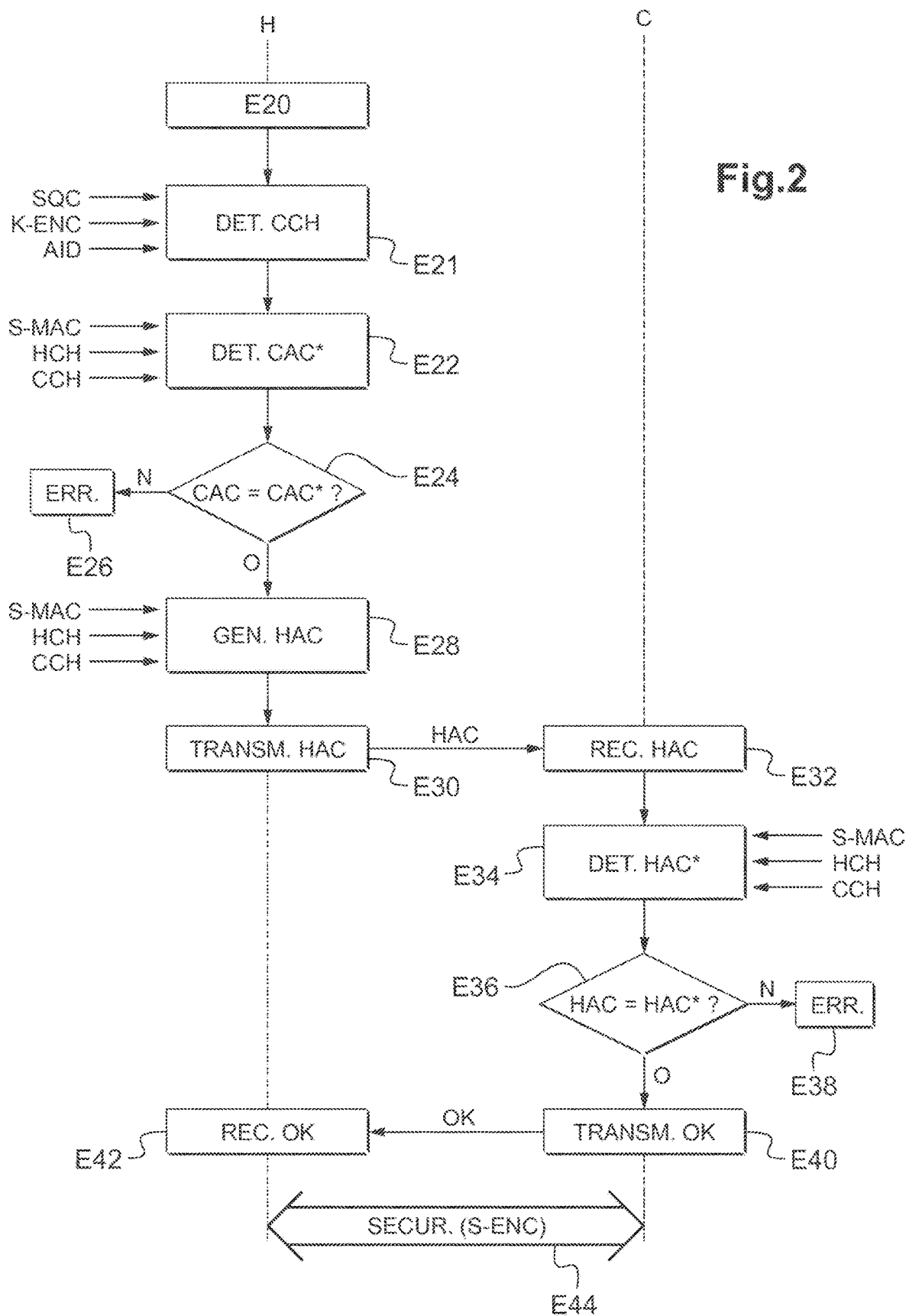
FIG. 2 represents the main steps of a mutual authentication process which follows up the initiation process of FIG. 1.

This completes the initialization phase of the mutual authentication process; the mutual authentication process can then continue in step E21 as explained hereinbelow with reference to FIG. 2.

In step E21, the terminal H determines the pseudo-random value CCH according to a method identical to that used by the microcircuit card C in step E10, using the current value of the counter SQC, the cryptographic key K-ENC and the identifier AID.

It is noted that, in the example described here, the terminal has received the current value of the counter in step E20 and has therefore been able to store a datum representative of this current value. In the embodiments where the value of the counter SQC is not transmitted by the microcircuit card in step E18, provision may be made for example for the counter to have an initial value equal to 0 (or another predetermined value) during the first exchange (first session) and for the terminal H to increment a datum representative of the current value of the counter SQC at each new session. Additionally, provision may optionally be made for the terminal H to be able to send a command (for example of the type GET DATA) so as to obtain in response (from the microcircuit card C) the current value of the counter SQC.

The cryptographic key K-ENC is for its part stored within the terminal H (it being a secret shared between the terminal H and the microcircuit card C). The value of the identifier AID is known from the application of the terminal H when the application installed on the terminal H and the application installed on the microcircuit card C are supplied by one and the same supplier. The value of the identifier AID is then written in the code of the application of the terminal H. Alternatively, the value of the identifier AID is transmitted by the microcircuit card C, after having received a command in this sense. The method continues in step E22 in which the terminal H determines on its side the cryptogram of the card CAC*, by means of the same process and of the same data as those used by the microcircuit card C in step E14. Accordingly, the terminal H generates in particular the session key S-MAC used, together with the host challenge HCH (generated by the terminal in step E2) and the pseudo-random value CCH (determined by the terminal H in step E21), to determine the cryptogram of the card CAC*.

Provision may be made for the terminal H to generate in this step other session keys, in particular the session key S-ENC already mentioned (calculated by the terminal H on the basis of the stored cryptographic key K-ENC, of the host challenge HCH generated in step E2 and of the pseudo-random value CCH determined in step E21).

The terminal H then compares in step E24 the cryptogram CAC* determined in step E22 with the cryptogram CAC received in step E20. It is noted that this step E24 is optional in predictive mode. Indeed, this mode makes it possible to pregenerate a set of sessions keys, and thus makes it possible to avoid having to connect the microcircuit card C and the terminal H. In this case, the card sends a response, but the terminal is not necessarily connected with the card C and does not therefore analyze this response.

If the result of the comparison is positive (that is to say if the cryptogram calculated CAC* is equal to the cryptogram received CAC), the microcircuit card C has responded correctly to the challenge of the terminal H and has therefore authenticated itself with the terminal H. The mutual authentication process can then continue in step E28 described below (for authentication of the terminal H by the microcircuit card C).

If the result of the comparison of step E24 is negative (that is to say if the cryptogram calculated CAC* is different from the cryptogram received CAC), the authentication of the microcircuit card C by the terminal H has failed and the terminal H then undertakes in step E26 the processing of this anomaly, for example by terminating the exchange of data with the microcircuit card C.

When the mutual authentication process continues (in case of positive result of the comparison in step E24), the terminal H undertakes in step E28 the generation of a host authentication cryptogram HAC.

The host authentication cryptogram HAC is for example generated by means of a key-derivation process and on the basis of one of the session keys SK (for example the integrity verification session key S-MAC), of the host challenge HCH (generated in step E2) and of the pseudo-random value CCH (determined in step E21). The determination of the host authentication cryptogram HAC is for example carried out in accordance with what is provided for in the paragraph "6.2.2.3 Host Authentication Cryptogram" in the document "*GlobalPlatform Card Technology—Secure Channel Protocol* 03—*Card Specification v 2.2 Amendment D*" already mentioned.

In order to obtain a host authentication cryptogram HAC that differs from the card authentication cryptogram CAC although the key-derivation processes used in each case are identical, provision is made in the example described here for the key-derivation process to be applied not only to the data mentioned hereinabove (session key S-MAC, host challenge HCH, pseudo-random value CCH), but also to a derivation constant (for example 1 byte in length) having different values respectively in the case of the generation of the card authentication cryptogram CAC (steps E14 and E22), where the derivation constant has for example the value 0, and in the case of the generation of the host authentication cryptogram HAC (steps E28 and E34 described below), where the derivation constant has for example the value 1.

The terminal H then transmits to the microcircuit card C the cryptogram HAC generated in step E28, for example within an EXTERNAL AUTHENTICATE command. Provision may be made to also transmit at this time a message authentication code so that the microcircuit card can verify the integrity of the cryptogram HAC transmitted.

The microcircuit card C receives the cryptogram HAC in step E32 and, after possible verification of the message authentication code when such a code is transmitted, stores the cryptogram HAC for subsequent comparison (see hereinbelow step E36).

The microcircuit card C then determines on its side in step E34 the expected value HAC* of the host authentication cryptogram on the basis of the same process and of the same data as those used in step E28. In this step the microcircuit card C uses the session key S-MAC generated in step E12, the host challenge HCH received in step E6, the pseudo-random value CCH generated in step E10 and the predetermined derivation constant associated with the calculation of the host authentication cryptogram (of value 1 in the example described here).

The microcircuit card can thus compare in step E36 the cryptogram HAC received in step E32 and the cryptogram HAC* determined (by the microcircuit card C) in step E34.

If the cryptogram received HAC and the cryptogram calculated HAC* are equal (positive result of the comparison), the terminal H has correctly authenticated itself with the microcircuit card C and the mutual authentication process therefore terminates successfully according to the modalities explained below (steps E40 and E42).

On the other hand, if the cryptogram received HAC and the cryptogram calculated HAC* are different (negative result of the comparison), the terminal H is not authenticated by the microcircuit card C and the opening of a secure channel between the terminal H and the microcircuit card C is therefore impossible. In this case provision is for example made for the microcircuit card C to dispatch in step E38 an error status to the terminal H in response to the EXTERNAL AUTHENTICATE command.

When the result of the comparison of step E36 is positive, the microcircuit card C undertakes in step E40 the sending to the terminal H of a response including a correct operating status OK.

The terminal H receives this response in step E42, thereby confirming the success of the mutual authentication process.

It is noted that at no time (whether in the course of the initiation phase described in FIG. 1 or in the course of the mutual authentication phase stricto sensu described in FIG. 2) has the challenge of the microcircuit card C intended for the terminal H (that is to say here the pseudo-random value CCH) been transmitted from the microcircuit card C to the terminal H.

The mutual authentication process being successfully completed, it is possible to put in place secure exchanges of data between the terminal H and the microcircuit card C (step E44), by enciphering for example the data exchanged by means of a symmetric encipherment algorithm using the encipherment session key S-ENC.

The invention claimed is:

1. A method of exchanging data between a first electronic entity and a second electronic entity in a secure channel established for an application, said method including the following steps implemented by the first electronic entity:
   reception of a host challenge originating from the second electronic entity;
   generation of a card challenge as a function of a current value of a counter, of a first secret key, and of an identifier of the application;

generating a session key as a function of a cryptographic key, of the host challenge and of said card challenge;

generation of a cryptogram as a function of the host challenge and of a second secret key;

transmission to the second electronic entity of a response including the cryptogram without transmission of said card challenge; and exchanging, between the first electronic entity and the second electronic entity, data enciphered by means of an encipherment algorithm using the session key.

2. The method as claimed in claim 1, in which the response includes a random number generated by the first electronic entity.

3. The method as claimed in claim 2, in which said random number is situated in the response at a location provided for the card challenge according to the Secure Channel Protocol 03 protocol.

4. The method as claimed in claim 1, in which the response includes a predetermined value.

5. The method as claimed in claim 4, in which said predetermined value is situated in the response at a location provided for the card challenge according to the Secure Channel Protocol 03 protocol.

6. The method as claimed in claim 1, in which the response includes said current value of the counter.

7. The method as claimed in claim 1, in which the cryptographic key is the first secret key.

8. The method as claimed in claim 1, in which the session key generated is the second secret key.

9. The method as claimed in claim 1, in which the step of generating the cryptogram uses said card challenge.

10. The method as claimed in claim 1, further comprising the following steps implemented by the second electronic entity:

determination of a number as a function of a datum representative of the current value of the counter and of the first secret key;

determination of another cryptogram as a function of the number and of a third secret key; and transmission of the other cryptogram to the first electronic entity for authentication of the second electronic entity by the first electronic entity.

11. The method as claimed in claim 1, in which the first electronic entity is a microcircuit card or a secure integrated circuit.

12. The method as claimed in claim 1, in which the second electronic entity is a remote server or a telecommunications terminal.

13. The method as claimed in claim 1, in which the cryptogram and said card challenge are respectively a card cryptogram and a card challenge in accordance with the Secure Channel Protocol 03 protocol.

14. An electronic entity comprising:

means for receiving a host challenge originating from another electronic entity;

a first generator that generates a card challenge as a function of a current value of a counter, of a first secret key, and of an identifier of an application;

means for generating a session key as a function of a cryptographic key, of the host challenge and of said card challenge;

a second generator that generates a cryptogram as a function of the host challenge and of a second secret key;

means for transmitting to the other electronic entity a response including the cryptogram without transmission of said card challenge; and means for exchanging, between the electronic entity and the other electronic entity, data enciphered by means of an encipherment algorithm using the session key.

15. A method of exchanging data between a first electronic entity and a second electronic entity in a secure channel, said method including the following steps implemented by the first electronic entity:

reception of a host challenge originating from the second electronic entity;

generation of a card challenge as a function of a current value of a counter and of a first secret key;

generating a session key as a function of a cryptographic key, of the host challenge and of the card challenge;

generation of a cryptogram as a function of the host challenge and of a second secret key;

transmission to the second electronic entity of a response including the cryptogram without transmission of the card challenge; and exchanging, between the first electronic entity and the second electronic entity, data enciphered by means of an encipherment algorithm using the session key.

* * * * *